Aug. 21, 1951  J. HECK, SR., ET AL  2,564,972
AUTOMOBILE WINDOW WIND DEFLECTOR
Filed June 30, 1947
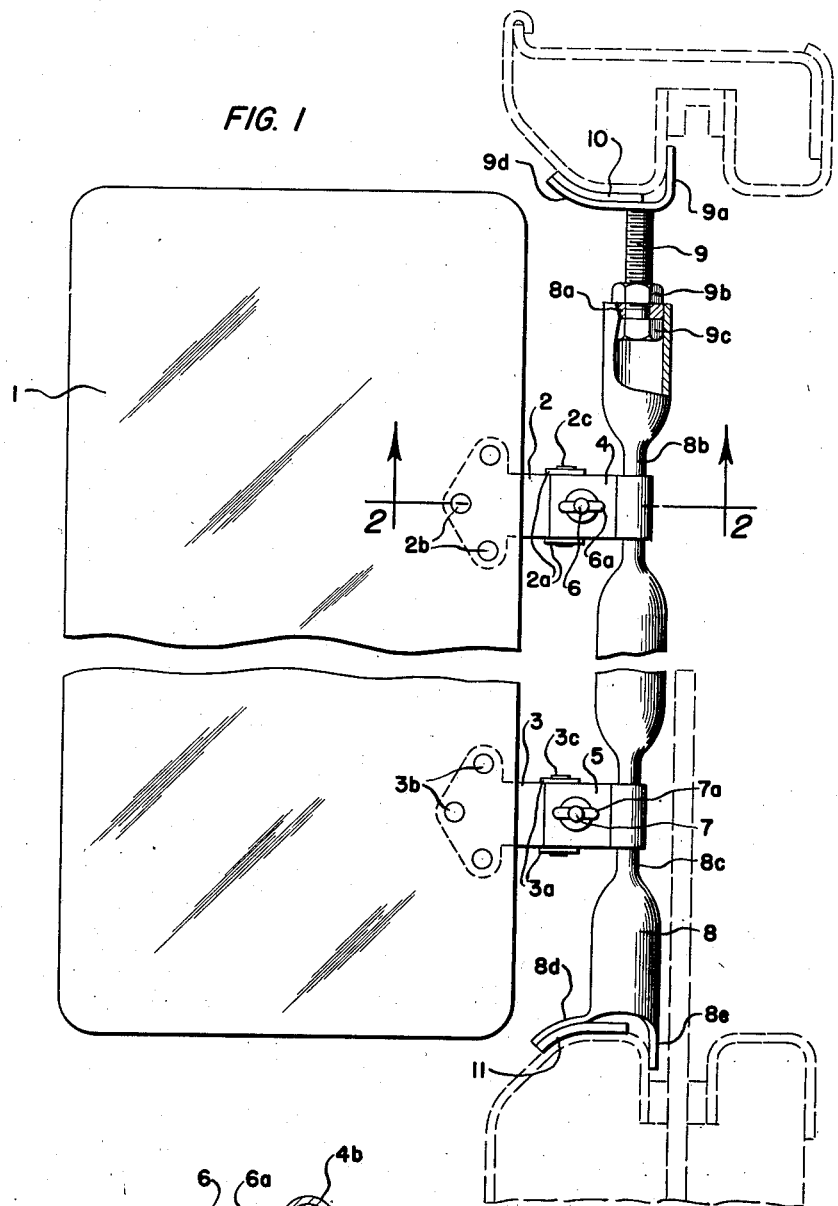
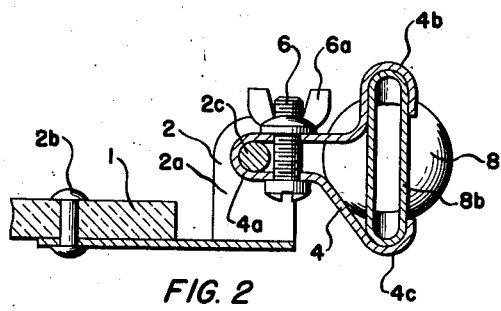
INVENTORS
JOHN HECK, SR. &
HERBERT A. MERKEL
BY
Wm. H. Dean
AGENT Patented Aug. 21, 1951

2,564,972

UNITED STATES PATENT OFFICE 2,564,972

AUTOMOBILE WINDOW WIND DEFLECTOR

John Heck, Sr., and Herbert A. Merkel,
San Diego, Calif.

Application June 30, 1947, Serial No. 758,178

3 Claims. (Cl. 296—84)

1

Our invention relates to an automobile window wind deflector and the objects of our invention are:

First, to provide a deflector of this class which automatically deflects the wind tending to enter the window of an automobile whereby draft inside the automobile body is reduced to a minimum when the automobile window is open.

Second, to provide a deflector of this class which is readily shiftable outwardly by the hand for signalling purposes during operation of an automobile.

Third, to provide a deflector of this class which is readily and easily installed in connection with various types of vehicles having a variety of window openings.

Fourth, to provide a deflector of this class which provides good vision at all times therethrough.

Fifth, to provide a deflector of this class which may be shifted to permit a small amount of air to enter by use of the elbow of the driver of an automobile.

Sixth, to provide a deflector of this class which is particularly useful when driving in traffic during a rain or wind storm, providing automatic closure of the automobile window after each traffic signalling operation performed by the left hand of the operator of the vehicle.

Seventh, to provide a deflector of this class which may be readily removed or installed and compactly stored when not in use, and Eighth, to provide a deflector of this class which is very simple and economical of construction, efficient in operation and which will not readily deteriorate or get out of order.

With these and other objects in view, as will appear hereinafter, our invention consists of certain novel features of construction, combination and arrangement of parts and portions as will be hereinafter described in detail and particularly set forth in the appended claims, reference being had to the accompanying drawing and to the characters of reference thereon forming a part of this application in which: Figure 1 is a fragmentary side elevational view of our wind deflector showing portions broken away and in section to amplify the illustration and showing the pane disposed substantially 90 degrees to the plane of an automobile window and illustrating by dash lines the relationship of an automobile window frame relatively to our wind deflector and Fig. 2 is a sectional view taken from the line 2—2 of Figure 1.

Similar characters of reference refer to similar parts and portions throughout the several views of the drawing.

The pane 1, brackets 2 and 3, clips 4 and 5, clamp bolts 6 and 7, rod 8, adjusting leg 9, and the pads 10 and 11 constitute the principal parts and portions of our automobile window wind deflector.

The pane 1 is preferably made of thin transparent plastic material but may be made of any other suitable material as desired. This pane 1 is substantially flat and rectangular in outline but may be varied in outline in accordance with the window opening adjacent to which it is adapted to be installed. Secured to the pane 1 by means of the rivets 2b and 3b are the brackets 2 and 3 respectively. These brackets 2 and 3 are each provided with U-shaped portions designated 2a and 3a respectively which straddle the clips 4 and 5 respectively through which the pins 2c and 3c extend. These pins 2c and 3c in connection with the U-shaped portions 2a and 3a of the brackets 2 and 3 respectively provide a pivotal bearing for the clips 4 and 5 respectively and the axis of the pins 2c and 3c are substantially aligned. As shown in Figure 2 of the drawing, the clip 4 substantially identical in construction to the clip 5 is provided with a folded U-shaped middle portion 4a fitted around the pin 2c and adjacent to the pin 2c extending through opposite sides of the clip 4 is the clamp bolt 6 which is substantially the same as the clamp bolt 7 in connection with the clip 5. This clamp bolt 6 is provided with a wing nut 6a for use in manually tightening the same for forcing the opposed jaws 4b and 4c of the clip 4 together. These jaws 4b and 4c are arranged to engage the edges of the elongated in cross section portion 8b of the rod 8. It will be here noted that a similar elongated in cross section portion 8c is provided for engagement by the clip 5. Elongation in the cross section of the rod 8 causes the same to be flattened as shown in Figure 1 of the drawings which prevents the clips 4 and 5 from turning relatively to the axis of the rod 8 and moving an appreciable distance longitudinally thereof. As shown in Figure 2 of the drawing it will be observed that a pane 1 rigidly connected to the brackets 2 and 3 is pivotal relatively to the clips 4 and 5 permitting the pane 1 to pivot relatively to the window opening when operated by the operator of the motor vehicle to which the wind deflector is attached or the pane 1 may be pivoted by air currents tending to enter the window of the automobile. Friction on the outer surface of the pin 2c connected to the bracket 2 as shown in Figure 2 of the drawing may be varied by the increased tightening of the bolt 6 by the wing nut 6a thereof. The rod 8 is a hollow tubular member having a foot 8d at its normally lower end engaging a pad 11 which rests on the frame of the automobile window as shown by dash lines in Figure 1 of the drawing. It will be here noted that this foot 8d is provided with a substantially vertically extending portion 8e arranged to engage the edge of the window frame for maintaining the rod 8 in certain lateral disposition relatively to the window of the automobile. The opposite end of the rod 8 is provided with a restricted opening 8a in which the adjusting leg 9 is positioned. This adjusting leg 9 is provided with a head 9c and a clamp nut 9b arranged to fix the same in certain longitudinal disposition with the rod 8 by tightening of said nut 9b against the end of said rod 8. Secured on the normally upwardly extending end of the adjusting leg 9 is the foot 9b engaging the pad 10 which bears on the automobile window frame. This foot 9d is provided with a substantially vertically extending portion 9a arranged to engage the channel side walls of the window frame for maintaining the lateral disposition of the rod 8 at its upper end. It will be here noted that the pads 10 and 11 are preferably made of soft spongy resilient material such as sponge rubber or the like and prevent the marring of the automobile window frame when our automobile window wind deflector is installed as shown in Figure 1 of the drawing.

The operation of our automobile window wind deflector is substantially as follows: When the pane 1 is engaged by air currents as an automobile passes along having our automobile window wind deflector in connection therewith, the air currents force the pane 1 into substantially parallel relationship with the surface of the automobile window. Thus the pane 1 is adapted to be positioned substantially 90 degrees from the position shown in Figure 1 of the drawing when in operation. A pivotal relationship of the pins 2c and 3c in connection with the brackets 2 and 3 engaging the clips 4 and 5 respectively permit the pane 1 to be freely pivotal on a substantially vertical axis. Thus the operator of a motor vehicle may extend his hand out the window thereof for signalling and force the pane 1 of our wind deflector outwardly as well. As the operator retracts his hand the air currents close the pane relatively to the window opening automatically preventing draft in the interior of the motor vehicle. If desired the operator may hold the pane 1 in slightly open position by resting his elbow thereagainst when driving along. In the installation of our automobile window wind deflector the rod 8 is placed intermediate the upper and lower portions of the window frame in the desired position and the nut 9b is tightened on the external threads of the adjusting leg 9 downwardly against the normally upper end of the rod 8 thus extending the adjusting leg 9 creating compression of the rod 8 intermediate the upper and lower portions of the window frame whereby the pads 10 and 11 under the feet 9d and 8d as shown in Figure 1 of the drawings provides firm frictional engagement of our automobile window wind deflector with the window frame structure of an automobile.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a wind deflector of the class described the combination of a rod longitudinally adjustable and adapted to be positioned vertically intermediate the upper and lower portions of an automobile window frame and a pane freely pivotly connected with said rod adapted to be positioned substantially parallel to the plane of said window frame and to be deflected by the wind, clips in connection with said rod fixed against rotation thereon and brackets in direct connection with said pane at its forward edge and pivotly connected to said clips, said rod made of hollow tubing having flattened portions in spaced relation to each other on which said clips engaged.

2. In a wind deflector of the class described the combination of a rod longitudinally adjustable and adapted to be positioned vertically intermediate the upper and lower portions of an automobile window frame and a pane freely pivotly connected with said rod adapted to be positioned substantially parallel to the plane of said window frame and to be deflected by the wind, clips in connection with said rod fixed against rotation thereon and brackets in direct connection with said pane at its forward edge and pivotly connected to said clips, said rod made of hollow tubing having flattened portions in spaced relation to each other, said clips having opposed jaw portions adapted to engage said flattened portions whereby said clips are prevented from turning on said rod.

3. In a wind deflector of the class described the combination of a rod longitudinally adjustable and adapted to be positioned vertically intermediate the upper and lower portions of an automobile window frame and a pane freely pivotly connected with said rod adapted to be positioned substantially parallel to the plane of said window frame and to be deflected by the wind, clips in connection with said rod fixed against rotation thereon and brackets in direct connection with said pane at its forward edge and pivotly connected to said clips, said rod made of hollow tubing having flattened portions in spaced relation to each other, said clips having opposed jaw portions adapted to engage said flattened portions whereby said clips are prevented from turning on said rod, clamp bolts extending through said clips adapted to tighten said jaws on said rod and adapted to adjust the pivotal frictional relationship between said clips and said brackets connected to said pane.

JOHN HECK, Sr.
HERBERT A. MERKEL.

REFERENCES CITED

The following references are of record in the file of this patent:

UNITED STATES PATENTS

| Number | Name | Date |
|---|---|---|
| 1,469,387 | Hubbard | Oct. 2, 1923 |
| 1,588,202 | Spencer | June 8, 1926 |
| 1,988,016 | Nisbet | Jan. 15, 1935 |
| 2,105,891 | Morrison | Jan. 18, 1938 |